US005913705A

United States Patent [19]

Kiesel

[11] Patent Number: 5,913,705

[45] Date of Patent: Jun. 22, 1999

[54] METHOD OF MAKING A HALOGEN INCANDESCENT LAMP

[75] Inventor: Rolf Kiesel, Aalen, Germany

[73] Assignee: Patent-Treuhand-Gesellschaft f. Elektrische Gluehlampen mbH, Munich, Germany

[21] Appl. No.: 08/845,329

[22] Filed: Apr. 23, 1997

[30] Foreign Application Priority Data

Jun. 12, 1996 [DE] Germany .......................... 196 23 499

[51] Int. Cl.$^{6}$ .................................................. C03B 27/07

[52] U.S. Cl. ................................ 445/27; 65/109; 65/110

[58] Field of Search ................................ 445/27; 65/108, 65/109, 110, 155

[56] References Cited

U.S. PATENT DOCUMENTS 3,788,830 1/1974 Shaw ........................................ 65/110
4,434,386 2/1984 Lowe ........................................ 445/27
4,540,373 9/1985 Rothwell .................................. 65/110
4,756,701 7/1988 Danko et al. .
5,528,101 6/1996 Gosslar et al. .

*Primary Examiner*—Kenneth J Ramsey
*Attorney, Agent, or Firm*—Frishauf, Holtz, Goodman, Langer & Chick

[57] ABSTRACT

To provide a halogen incandescent bulb with controlled variation in wall thickness of the bulb, a bulb tube (20) first has a cup region (26) formed thereon. The cup region, by radial application of force, for example by rollers (22), is constricted, and the constriction then pulled to form a small, closed projecting tip (19). Mold jaws (27) then mold the shape of the bulb; the mold jaws are formed with a cavity (29') to receive the projecting tip (19) which, then, has the end cut off to provide an attachment cannula (30) for the pumping tube (32). The pumping tube is melted on the nipple (29) of the cup (26) of the bulb. A filament mount (8) with filaments (9) is then introduced, and pinch jaws (35) pinch-seal the filament mount in the bulb and finish-shape the bulb. The bulb can then be flushed, evacuated, and filled with the requisite halogen containing fill through the pumping tube (32), which then is tipped off.

9 Claims, 3 Drawing Sheets

METHOD OF MAKING A HALOGEN INCANDESCENT LAMP

Reference to related patent, the disclosure of which is hereby incorporated by reference:

U.S. Pat. No. 4,756,701, Dano et al.

U.S. Pat. No. 5,528,101, assigned to the assignee of this application.

FIELD OF THE INVENTION

The present invention relates to a method to make a halogen incandescent lamp, and more particularly to a method which is simpler than prior art manufacturing processes, while resulting in a lamp in which the wall thickness of the lamp bulb can be effectively controlled.

BACKGROUND

Halogen incandescent lamps are frequently used for illumination, usually in combination with reflectors. Such lamps may be coated with an infrared reflecting layer on the lamp bulb to decrease the power rating of the lamp, while still retaining high filament temperature. The lamp bulb is shaped, preferably, exactly or at least essentially in the shape of an ellipsoid.

A manufacturing process to make halogen incandescent lamps of the general type to which the present invention relates is described in U.S. Pat. No. 4,756,701, Danko et al. In accordance with this method, the future lamp bulb is formed by preforming a glass tube at one end to have cup shape, leaving however an opening at the apex of the cup. A pumping tube is melted into that opening. The subassembly is then placed into a mold which completely surrounds it, leaving however the end of the pumping tube free. The bulb is fitted against the inner contour of the mold by inserting an inert gas, with pressure, through the pumping tube. The major portion of the bulb, thus, receives its final shape in this step, and particularly in the region of the cupped end and the adjacent zone of the bulb. A filament mount, together with the filament, is then inserted, and this second subassembly is placed into a pinch mold, so that the second end of the lamp bulb can be closed off with a pinch seal, at the same time forming the remaining portion of the lamp bulb. The lamp bulb is then evacuated through the pumping tube, filled, and the pumping tube is severed and the opening tipped off by melting.

This method requires several individual steps which are time-consuming, so that the overall method becomes expensive. Upon shaping of the bulb, a region adjacent the cupped end is left open, so that, adjacent the molten-in connection of the pumping tube, the shape of the bulb may not always have the desired form.

THE INVENTION

It is an object to simplify the production method for a halogen incandescent lamp having the usual components of a bulb, a fill in the bulb, and electrodes including a filament therein, which is economical of time and costs, and which provides for accurate shaping of the bulb to the desired contour.

Briefly, a tube which is formed with a rounded, cupped end is first shaped to the desired form. The first, or distal end of the bulb—with respect to the later base end of the bulb—is thus completely preformed, so that no irregularities can result when melting-on a pumping tube to the cupped closed end. The pumping tube is, thus, placed on a preformed attachment point of the bulb. Small leaks, which might arise in the region of the transition between the bulb wall and the material of the pumping tube are completely sealed during a later tipping-off step of the pumping tube, so that the bulb will be completely gas and air-tight.

The method of the present invention will result in a single-ended, single-based halogen incandescent lamp, that is, in a lamp in which the lamp bulb is sealed off by means of a single pinch seal. In the distal side, that is, in the side remote from the pinch seal, and hence the terminal end of the lamp, the bulb is in the shape of a cup, with merely the tipped off end from the pumping tube projecting therefrom. Two current supply leads, forming part of a filament mount, are gas-tightly connected through the pinch seal. The filament is located, of course, within the bulb.

The steps, in accordance with the present invention, to make the lamps, briefly, are:

a) a bulb tube, a pumping tube, and a filament mount, together with a filament, are first provided, as the basic components of the future lamp;

b) one end of the bulb tube, which will form a first end or distal end of the bulb, is closed, and rounded by application of radial force, to form a completely closed first end of the bulb tube and the end is drawn, to form a projecting tip;

c1) the bulb tube is then placed into a mold form, which has the contour of the later shape of the lamp bulb; this mold form is formed with a small cavity to receive the tip at the distal end in the region of the cupped end;

c2) inert gas is introduced through the second, still open end of the bulb tube, under pressure, thereby embedding the bulb tube entirely within the mold, and forming a nipple for the pumping tube in the central cup-shaped end, where the mold is formed with the cavity;

d1) the bulb tube is removed from the mold;

d2) the bulb tube at the proximate or base end is cut off to the desired length of the final lamp to be made;

d3) the tip end of the nipple at the distal end is severed, thereby leaving an open cannula-like projecting tip;

e) the pumping tube is melted on the open cannula-like tip;

f) the filament mount, with the filament thereon, is introduced into the open, second end of the bulb tube;

g) the second end of the bulb tube, through which the filament mount was inserted, is then pinch-sealed between pinch jaws; the pinch jaws are so shaped that they not only form the pinch surfaces to hold the filament mount in position, but additionally have mold surfaces to shape the bulb into desired form in the region adjacent the pinch seal;

h) the lamp bulb is evacuated and then filled with the appropriate fill through the pumping tube; and i) the bulb is tipped off by melting off or tipping off excess pumping tube material, and thereby closing the bulb.

This method ensures that the region of the bulb at the first or distal end will have the desired shape since that region is completely preformed, and no irregularities can result by melting-on of the pumping tube to the distal, cupped end of the bulb, since the connection region for the pumping tube also has been preformed. Minor leaks which might result in the region of the transition between the bulb wall and the pumping tube material are sealed during the tipping-off of the bulb.

When the second end of the bulb tube is closed by the pinch-sealing operation, step g) above, the desired and original shape of the bulb, which may deform due to the heating step necessary before the pinch can be made, is determined. It is sufficient that the pinch jaws so surround the bulb over a width of from about 5 mm to 8 mm, starting from the point where the pinch starts, that the shape of the bulb is controlled to ensure that the bulb will have the desired, that is, design shape.

In accordance with a preferred feature of the invention, the shape of the lamp bulb is precisely or at least approximately an ellipsoid. The lamp bulb can be provided with an infrared reflecting coating, as well known. Such a coating, preferably, is an interference filter, in which several layers of titanium oxide and silicon oxide are alternately applied, as known. Use of the ellipsoid as a basic shape, and an interference filter coating, increases the efficacy of the lamp.

The material of the lamp, and hence of the bulb tube, may be quartz glass or hard glass. If quartz glass is used, the lamp mount will not only have the necessary current supply leads and externally extending contact pins, but also connecting foils which are pinched within the pinch seal. If hard glass is used, the foils are not necessary.

The method of the present invention has the advantage that the wall thickness within the region of the lamp bulb can be effectively controlled to be highly uniform. The bulb tube, originally, may have a wall thickness of about 1 mm. Use of such a wall thickness ensures that the finished bulb, at no point, will be thinner than 0.6 mm.

DRAWINGS

FIG. 1 is a highly schematic front view of a finished halogen bulb made in accordance with the present invention; and FIG. 2*a* through FIG. 2*g* show, schematically, sequential steps in the manuacture of the lamp of FIG. 1.

DETAILED DESCRIPTION

Figure 1:
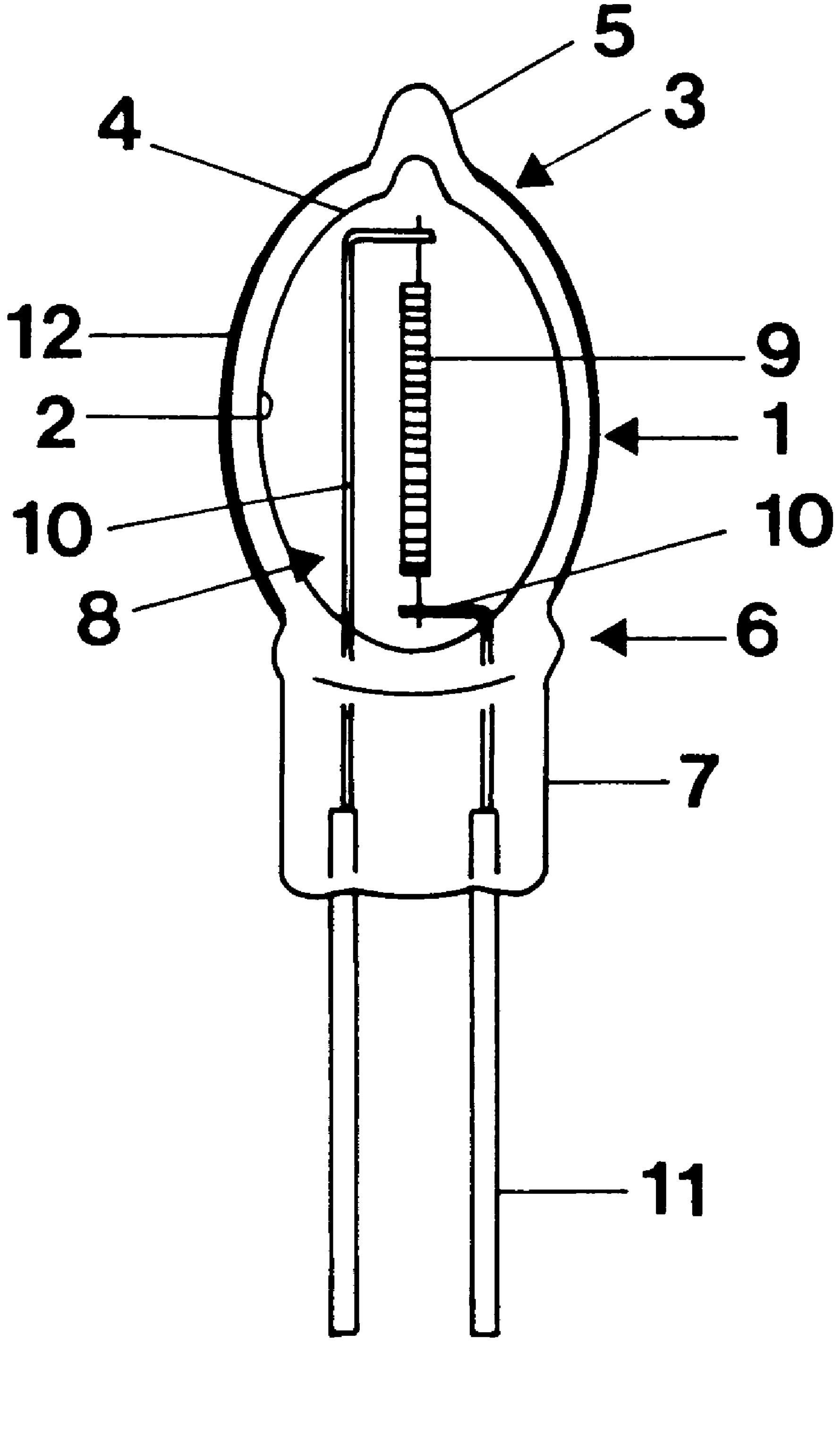

Referring first to FIG. 1:

The halogen incandescent lamp is a single-ended, single pinch-sealed lamp which has a bulb 1 made of hard glass, with an ellipsoid or ellipsoid-like bulb surface 2. The lamp retains a fill including an inert gas with a halogen additive. The lamp has a first or distal end 3, which is rounded in a deep cupped shape 4. A pump tip 5 projects from the rounded cup 4. The second or proximate or connecting end 6 is also rounded. The bulb is closed by a pinch seal 7. The filament is part of a filament mount 8 which retains the axially located filament 9. The filament mount 8 has two angled-off current supply leads 10 within the lamp bulb, which are welded to two solid sturdy contact pins 11. The connection is within the pinch seal 7. An external interference filter coating 12, which is infrared (IR) reflective, is applied to the bulb at the outside.

The manufacturing steps are best seen with reference to FIGS. 2*a*–2*g*.

Figures 2A, 2B, 2C:
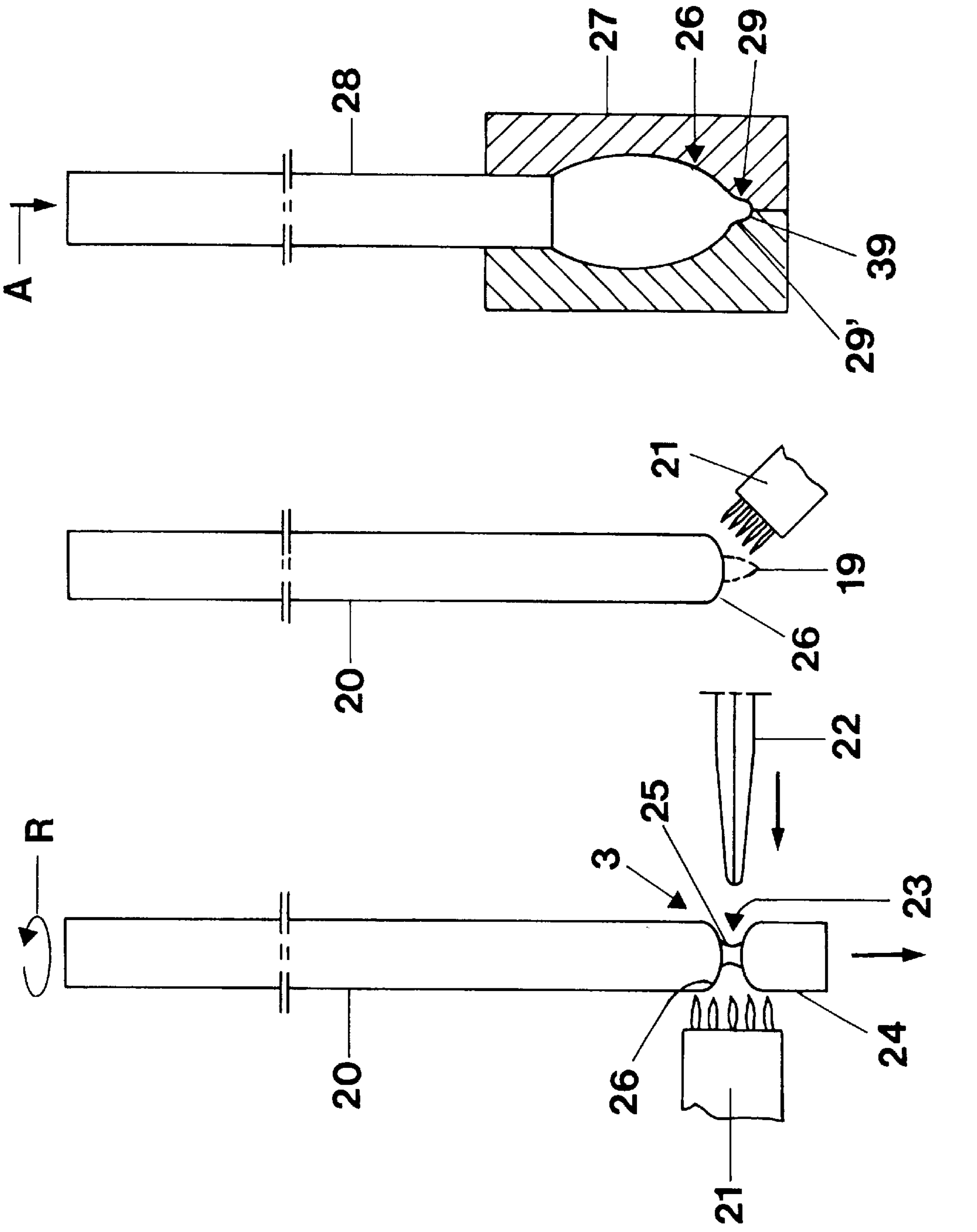
Figure 2D:
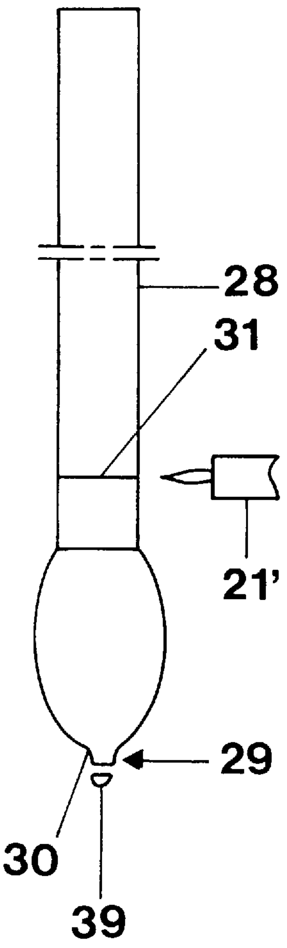

In a first step, FIG. 2*a,* a cylindrical bulb tube 20 of hard glass, with a wall thickness of about 1 mm, is closed at a first end 3, which will become the distal end of the lamp, to form a cup 26. The bulb tube 20, which may have a length of 1.2 meters originally, is held in vertical position with the end 3 downwardly. It is rotated about its axis, as schematically shown by rotation arrow R. Gas burners 21 provide for localized heating, spaced about 10 mm from the lower edge of the bulb tube 20. When the softening temperature of the glass is reached, a roller 22 is applied to form a constriction 23. The remaining tube portion 24 is pulled off downwardly.

In accordance with a feature of the invention, this pulling step is carried out slowly, that is, with a speed of at the most 10 mm/sec., so that the softened glass will collapse to a cannula extension 25 having a diameter of at least 1 mm. This cannula-like extension will form a hollow tip which is severed by an intense flame applied about 2 mm below the pulled-off bulb tube 20. As a result, the remainder of the cannula extension will form a small glass tip 19, shown in broken-line representation in FIG. 2*b*.

The tip 19, projecting from the cupped end 26, is melted by burner 21 FIG. 2*b*. This increases the wall thickness at that region and closes tip 19. This reinforcement or increase of the thickness is necessary so that the connection region for the pumping tube, upon later formation of the bulb, will be of sufficient wall thickness. The pumping connection tip, which is formed of bulb material, should have approximately the same wall thickness as the separately provided pumping tube, which will be applied later.

The bulb tube 20 is then heated over a length which is necessary to form the ellipsoid-shaped bulb while it is rotated (arrow R), and introduced into the ellipsoid bulb mold form 27, FIG. 2*c*. The bulb mold form 27 is a two-part mold having two forming jaws, into which the bulb tube 20, with the cupped end 26 and the closed tip 19, is introduced. The second, still open end 28 of the bulb tube extends from the ellipsoid mold 27; the first, cupped, rounded end 26 is completely embedded in the mold 27.

In accordance with a feature of the invention, the mold 27 is formed with a small cavity 29' to form an integral pumping tube attachment nipple. The final shape of the bulb is now obtained by blow-molding. Inert gas is introduced through the second still open end of tube 28, see arrow A, under pressure, so that the original cylindrical bulb tube will fit against the inner contour of the mold 27. Additionally, a nipple 29 will be formed within the cavity 29' to provide a pumping tube attachment at the distal end. The second or connecting end 28 of the bulb tube continues to remain open. Blow-molding the bulb can be done while the mold 27 is stationary, as well as during rotation thereof, see arrow R.

The thus formed nipple 29 extending from the pumping tube attachment portion of the bulb is still closed. In a next step, see FIG. 2*d,* the tip 39 of the nipple 29 is severed, so that the remaining portion of nipple 29 forms an open duct or cannula 30. The separating rim between the cannula 30 and the pumping tube attachment portion next to nipple 29 preferably is close to the outer end of the bulb so that the edge of the cannula 30, in a later step, is reliably within the range of the melting zone of the pump tube. Thus, possible fine cracks, fissures, or leaks between the material of the wall of the bulb and of the pumping tube are reliably avoided, since this zone is within the region where the pumping tube will later be severed and, thus, will be heated to melting temperature once more.

Roughly at the same time of severing of the tip 39 of the nipple 29, that is, either shortly therebefore or shortly thereafter, or simultaneously, the opposite or connecting end of the bulb is formed. In the region of the second end 28 of the bulb 2, a pointed gas flame 21 is applied, in ring shape, to provide a circumferential thermal stress ring 31 around the remaining bulb tube and, in the drawing of FIG. 2*d,* upwardly above the bulb. The excess cylindrical end of the bulb tube is cut off or cracked off.

Figure 2E:
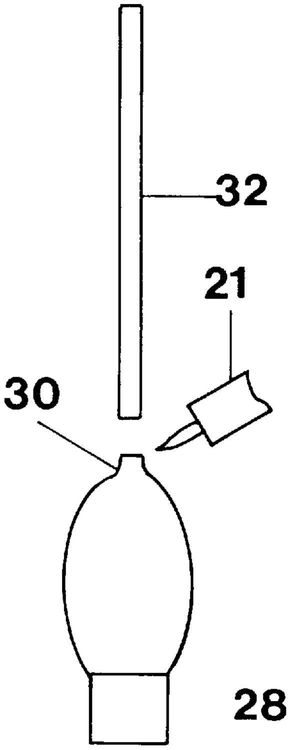

In a next step, see FIG. 2*e,* the region of the cannula 30 is heated by gas burner 21 and the pumping tube 32 is melted-on unto the cannula 30. Preferably, the material of the pumping tube is the same as that of the bulb, but it may also be made of a different glass.

Figure 2F:
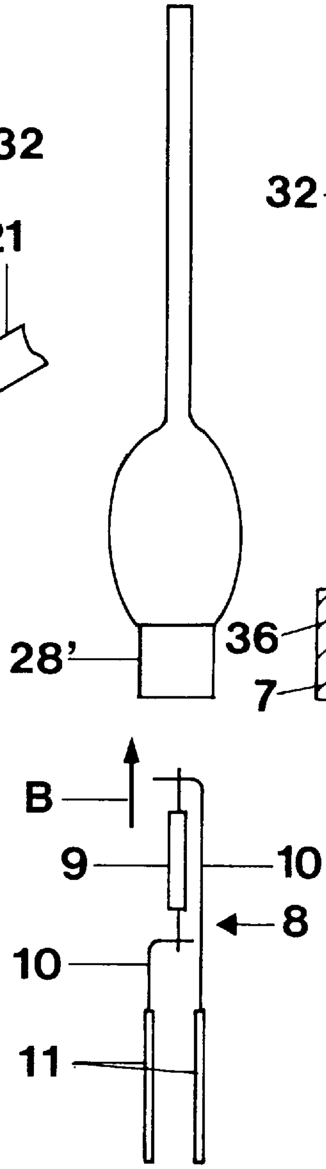

In another step, see FIG. 2*f,* premanufactured filament mount 8 is introduced, see arrow B, into the shortened second, still open end 28' of the bulb tube. This mount 8 is formed of two current supply leads 10, which have contact or terminal pins 11 butt-welded thereto. A filament 9 is held between angled-off ends of the filament leads 10, for example by welding, as well known.

The lamp subassembly, with the filament mount 8 introduced therein, is now heated in the region of the shortened open end 28'. This heating step is not shown specifically in the drawing. As soon as the end 28' is softened, the subassembly is introduced into molding jaws 35 which form the pinch seal 7, FIG. 2*g*. The molding jaws 3 have pinch portions 35' and, in addition thereto, extended portions 36 which are shaped to form the particular ellipsoid or essentially ellipsoid shape of the bulb. In order to reliably obtain the ellipsoid, or essentially ellipsoid form of the bulb or, respectively, to reconstitute this shape, a flushing gas, for example argon, is introduced through the pumping tube 32, see arrow C, with over-pressure in order to re-shape or re-form the lower portion of the bulb in the region of the shaped end portions 36 of the pinching jaws. These pinching jaws may extend over a width of about 6 mm.

In a final step, not shown in the drawing because well known, the bulb is flushed through the pumping tube 32, evacuated, and filled with an inert gas with a halogen additive. Then, the region of the connection between the pumping tube and the bulb is heated, and the pumping tube is melted off or tipped off, so that only the small pumping tip 5 (FIG. 1) remains on the bulb.

The selected geometry of the ellipsoid depends on the desired dimensions of the light emitting element, that is, the filament 9. This geometry is selected especially with respect to the length of the filament 9. The focal points of the ellipsoid should be on the filament. Rather than using an ellipsoid, a different contour may be selected, for example a free surface form similar to an ellipsoid.

Figure 2G:
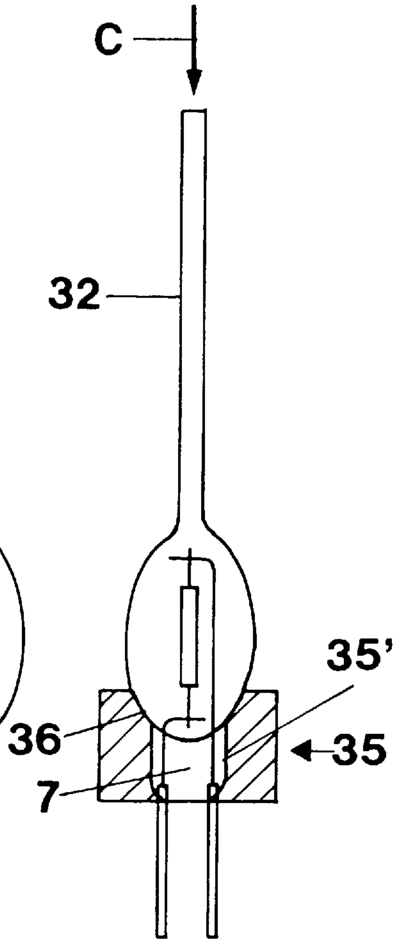

The wall of the bulb need not be formed completely as shown in and described in connection with FIG. 2*c*. Rather than forming the entire bulb, it may only be necessary to form merely a portion thereof, preferably a major portion of the bulb and adjacent the pumping zone 29' and the nipple 29, that is, essentially the lower half, and preferably more than the lower half of the bulb as illustrated in FIG. 2*c*. The remainder of the bulb is then formed by extended pinch jaws 35 (FIG. 2*g*).

Various changes and modifications may be made within the scope of the inventive concept.

I claim:

1. A method to make a halogen incandescent lamp, in which the lamp comprises a filament mount (8) and an electrical filament (9) retained on the filament mount;

a lamp bulb (1) within which said filament mount and said filament are retained, said lamp bulb (1) defining a connection end and a distal end;

a pinch seal (7) formed on said connection end in which said lamp bulb is sealingly retained;

a cup portion (26) formed at the distal end of the bulb, and a halogen containing fill in the bulb, said method comprising the steps of:

a) providing a bulb tube (20), a pumping tube (32) and the filament mount (8) together with the filament (9), to form basic components of the future lamp;

b) completely closing one end of the bulb tube and rounding said end of the bulb tube to form a completely closed rounded cup-shaped first end (26) thereof;

c1) placing the bulb tube (20) with the rounded end (26) into a mold form (27), which mold form has the contour of the later shape of the bulb, and further is formed with a small cavity (29') in a central or middle region of the cupped end (26) of the bulb tube;

c2) introducing an inert gas through the second, still open end (28) of the bulb tube (20), under pressure, to thereby embed the bulb tube entirely within the mold form, and form a nipple (29) in said middle region of the cup-shaped end (26) and in the location where the mold form has said cavity (29');

d1) removing the bulb tube (20) from the mold and severing the uncupped end of the bulb tube to the desired length of the final lamp leaving a shortened open end (28') of the bulb tube, d2) severing the tip end (39) of the nipple (29), thereby leaving an open cannula-like projecting tip (30);

e) melting-on the pumping tube (32) on the open cannula-like tip (30);

f) introducing the filament mount (8) with the filament (9) thereon into the open end (28') of the bulb tube;

g) pinch-sealing the second end (28') of the bulb tube, and the filament mount (8) therein with pinch jaws, wherein the pinch jaws are shaped to form the surfaces of the pinch seal which hold the filament mount in position and additionally are formed with mold surfaces (36) to shape the bulb into desired form in the region adjacent the pinch seal;

h) evacuating the lamp bulb through the pumping tube (32) and then filling the lamp fill into the bulb through the pumping tube; and i) tipping off the bulb by melting off or tipping off excess length of the pumping tube (32), thereby closing and sealing the bulb.

2. The method of claim 1, wherein the mold form (27) which molds the bulb tube molds a bulb of ellipsoid or approximately ellipsoid shape.

3. The method of claim 1, further including the step of placing an infrared reflecting coating (12) at the outside of the bulb.

4. The method of claim 1, wherein the material of the bulb tube (20), and hence of said bulb (3), comprises at least one of quartz glass, hard glass.

5. The method of claim 1, wherein the material of the pumping tube (32) and the material of the bulb tube (20) are the same.

6. The method of claim 1, wherein said step b) comprises heating said one end of the bulb tube, and constricting the diameter of the bulb tube (20) by applying lateral, radially directed force thereagainst to form the rounded cup-shaped end (26).

7. The method of claim 6, including the step of slowly drawing bulb tube material axially beyond the region of constriction to form a glass tip (19) which, upon molding in step c1), will result in reinforcement of the wall thickness in the middle region of the cup end (26) of the bulb tube (20).

8. The method of claim 7, wherein the heating is so applied that said tip (19) melts closed.

9. The method of claim 6, wherein said radial force is supplied by applying at least one radially directed roller (22) against said bulb tube to constrict the diameter of the bulb tube.

* * * * *

UNITED STATES PATENT AND TRADEMARK OFFICE

CERTIFICATE OF CORRRECTION

PATENT NO. : 5,913,705
DATED : June 22, 1999
INVENTOR(S) : Rolf Kiesel

It is certified that error appears in the above-identified patent and that said Letters Patent is hereby corrected as shown below:

Title page, item [56], insert the followings:

U. S. PATENT DOCUMENTS

| EXAMINER INITIAL | | PATENT NUMBER | | | | | | | ISSUE DATE | PATENTEE | CLASS | SUBCLASS | FILING DATE IF APPROPRIATE |
|---|---|---|---|---|---|---|---|---|---|---|---|---|---|
| | | 2 | 4 | 9 | 1 | 2 | 3 | 7 | 12/1949 | WAY | | | |
| | | | | | | | | | | | | | |

OTHER DOCUMENTS ( Author, Title, Date, Pages, Publication, etc.)

| |
|---|
| PATENT ABSTRACTS OF JAPAN, Vol. 018, No. 419 (E-1589), 5 August 1994 and JP 06-132019A (Koito Mfg. Co. Ltd.), 13 May, 1994 |

Signed and Sealed this

Sixteenth Day of November, 1999

Attest:

Q. TODD DICKINSON

*Attesting Officer*

*Acting Commissioner of Patents and Trademarks*